(No Model.) 2 Sheets—Sheet 1.

M. HYNES.
COUNTER MACHINE.

No. 285,134. Patented Sept. 18, 1883.

Witnesses:
E. C. Varey
A. Thom

Inventor
M. Hynes,
Per: J. A. Rennie
Atty.

(No Model.)  2 Sheets—Sheet 2.

M. HYNES.
COUNTER MACHINE.

No. 285,134.  Patented Sept. 18, 1883.

Witnesses:
E. C. Varey.
A. Thom.

Inventor,
M. Hynes
Per J. A. Rennie
Atty.

N. PETERS, Photo-Lithographer, Washington, D. C.

UNITED STATES PATENT OFFICE.

MICHAEL HYNES, OF MONTREAL, QUEBEC, CANADA.

COUNTER-MACHINE.

SPECIFICATION forming part of Letters Patent No. 285,134, dated September 18, 1883.

Application filed December 8, 1882. (No model.)

*To all whom it may concern:*

Be it known that I, MICHAEL HYNES, of the city of Montreal, in the District of Montreal and Province of Quebec, in the Dominion of Canada, have invented certain new and useful Improvements in Machines for Making Heel Counters or Stiffeners for Boots and Shoes; and I do hereby declare that the following is a full, clear, and exact description of the same.

My invention has reference to improvements in machines used to form heel counters or stiffeners for boots and shoes, and has for its object to produce counters in a more rapid and simple manner than by the machines at present in use.

To that end it may be said to consist in arranging the plungers upon a horizontal toothed rack which slides within suitable guides in the frame-work of the machine, said plungers being caused to enter molds placed at each end of the machine and in direct line with the plungers by the action of a sector-gear intermeshing with the said horizontal rack, said sector-gear having a curved arm or horn made integral therewith and extending downward, being also provided with an oppositely-curved arm or horn fulcrumed at its upper end, and joined by means of an adjusting bolt and nut at its lower end to the other arm or horn, and between which arms a roller or stud, made adjustable within a gear-wheel, works, and which bears alternately upon the arms or horns by the revolution of the said gear, thereby imparting a rocking motion to the sector-gear, which causes the horizontal rack to reciprocate, in the manner hereinafter more fully described. By the peculiar construction of my molds, also hereinafter more fully described, I am enabled to produce perfect counters from the most delicate substance—such as paste-leather—and also to form the "upturn" or "flange" of the counter, an operation heretofore found difficult to perform without the aid of complicated mechanism.

For more thorough comprehension of my invention reference must be had to the accompanying drawings, in which similar letters of reference indicate like parts, and where—

Figure 1:
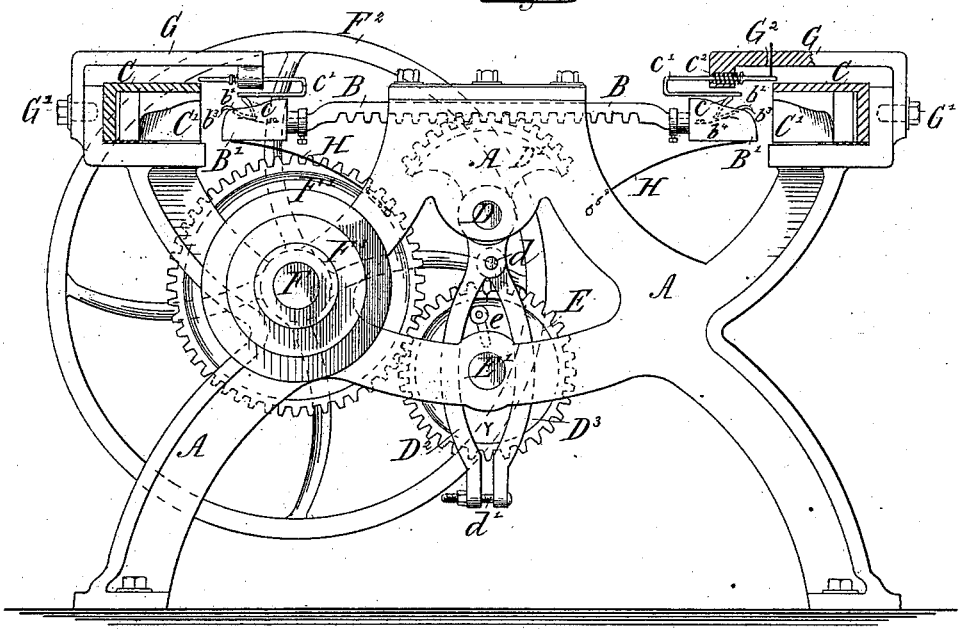
Figure 2:
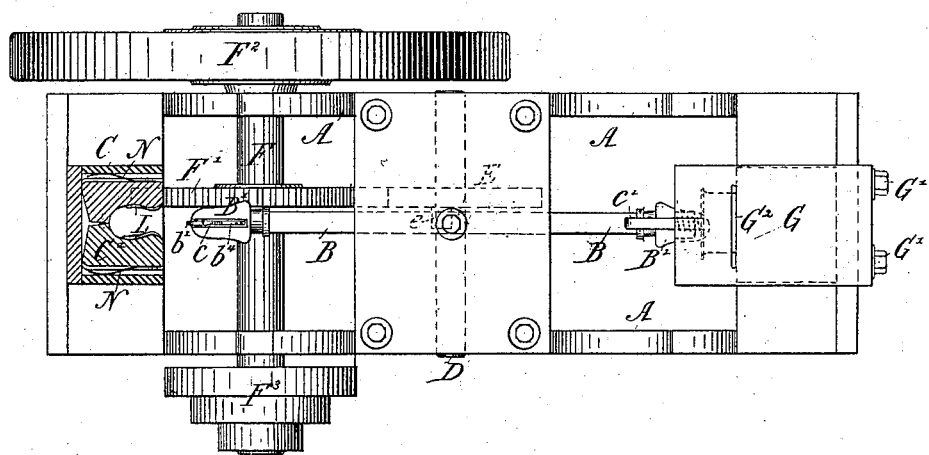
Figure 3:
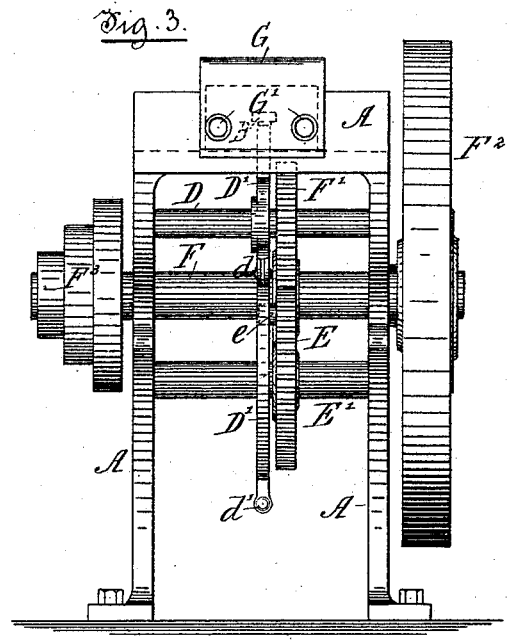
Figure 8:
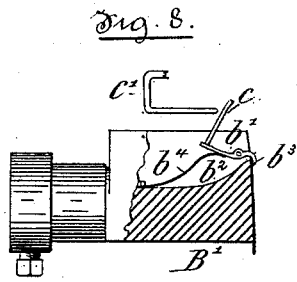
Figure 9:
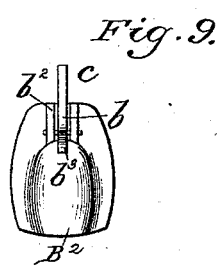
Figure 4:
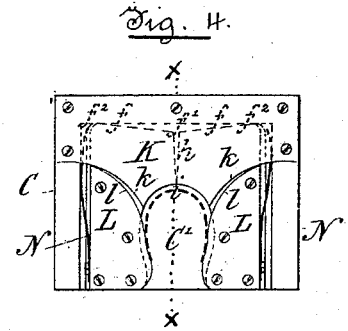
Figure 5:
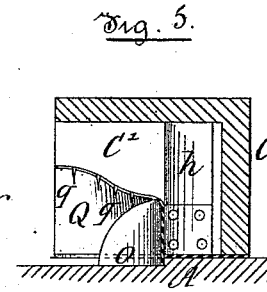
Figure 6:
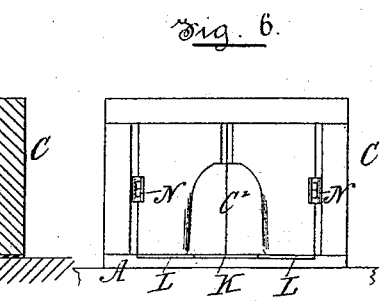
Figure 7:
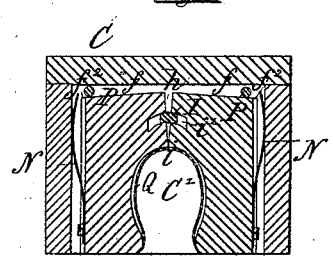

Figure 1 is a side elevation of a machine, partly in section, embodying my invention. Fig. 2 is a plan view of the same, showing one mold in section. Fig. 3 is an end elevation. Fig. 4 is a plan view of my improved molds inclosed within the casing, showing the under side of the same, with the bottom plate of the casing removed. Fig. 5 is a vertical section of the same, taken on line $x\,x$, Fig. 4. Fig. 6 is a front view of the same. Fig. 7 is a modification of the arrangement of my molds. Fig. 8 is a side view of my plunger, partly cut away to show the arrangement of the gripper and its relative position with the feeding device. Fig. 9 is a front view of my improved plunger.

A designates the frame-work, made of any desired shape and strength, in the center of which works a horizontal toothed rack, B, sliding in suitable guides, made for the purpose, in the frame. To each end of this rack is attached a plunger or punch, B' B', in any ordinary or approved way. In a direct line with these plungers and bolted or otherwise fastened at each side of the frame A, are the casings C C, in which the molds C' C' work, as will be more fully described hereinafter.

Upon a shaft, D, carried in the frame A, is mounted a sector-gear, D', which intermeshes with the horizontal toothed rack B. This sector-gear has a curved arm or horn, D², preferably made integral therewith and extending downward, being also provided with an oppositely-curved arm or horn, D³, fulcrumed at its upper end at the point $d$ and joined at its lower end to the other or rigid arm, D², by means of an adjusting bolt and nut, $d'$.

A gear-wheel, E, is mounted upon a shaft, E', carried in the frame A, and is provided with a small roller or stud, $e$, preferably made adjustable therein, (the means of adjusting this roller or stud may be of any ordinary or desired kind, and are therefore not shown in the drawings,) which works upon the inside surfaces of the arms or horns D² D³ by the revolution of the gear-wheel E, and causes the sector-gear to act upon the horizontal rack B, imparting a reciprocating motion thereto and causing the plungers to alternately enter the molds C C at each end of the machine. The roller or stud $e$ is made adjustable in the gear-wheel E for the purpose of increasing or lessening the travel of the rack B, and in consequence the pressure of the plungers upon the molds, as by moving the roller or stud nearer the center of the gear-wheel E the throw of the sector-gear will be lessened, and by moving it farther away from the center it will be increased, thus enabling me to regulate the action of the plungers, so that the desired pressure may be had upon the counter. The adjusting bolt and nut $d'$ also enable me to give further adjustment to the throw of the sector-gear and also to regulate the stop of the travel of the rack B between each circuit of the pulley $e$ as it passes the open parts at Y Y, Fig. 1, as by spreading the arms farther apart the stop will be greater and the travel of the rack less, and in like manner by drawing the arms closer together will the stop be lessened and the travel increased.

Upon the driving-shaft F is mounted another gear-wheel, F', which intermeshes with the gear-wheel E and imparts motion to the same. This shaft is also provided with the ordinary fly-wheel, $F^2$, and driving-pulleys $F^3$, as shown.

The plungers B' B' are provided with grippers $b'$, fulcrumed at about their center, which work in grooves $b^2$, made in the plungers, their lips $b^3$ bearing against the front of the plungers by the aid of springs $b^4$, which press beneath their opposite ends. These springs $b^4$ are made fast to the plungers within the grooves $b^2$, and always bear firmly upon the rear ends of the grippers $b'$, so as to keep the lips $b^3$ pressed upon the counters when they are about to enter the molds, and when the plungers have been withdrawn the grippers will release their hold upon the counter in the manner hereinafter described. The grippers $b'$ are further provided with projecting arms or pins $c$, preferably made integral therewith, which come in contact with the forked ends of arms $c'$. The other ends of these arms are so placed as to be slightly above the top of the casings C C. These forked arms $c'$ slide in bearings $c^2$, made in standards G, which standards are attached to the frame A by means of bolts or screws G', and the said forked arms are held in position by the aid of spiral springs $g$, placed within the bearings $c^2$, and which press upon the shoulders $c^3$. An opening, $G^2$, is made in each of the standards G, the size of the counter, into which the counter-blanks are placed, and falling downward will bear or rest upon the arm $c'$, for purposes which will be more fully defined hereinafter.

Springs H H are attached to the frame and so placed that their outer ends will bear upon the bottom surfaces of the plungers, and will have the effect, when the grippers have released their hold upon the counters, of forcing them away from contact with the plungers B', which then drop into any receptacle placed to receive the same.

The molds C' C', as before mentioned, are inclosed within the casings C C, and are made up of two halves, and have their rear ends, $f$, beveled inward toward the center $f'$, and their outer ends or corners, $f^2$, bear against the ends of the casing C. The meeting surfaces are beveled from inside to outside, thus forming a pivot-point, $i$, upon which the molds will work. These molds are kept close with relation to each other by having a connecting-piece, I, dropped into a groove, $i'$, formed in each of the molds C' C'; but, as I find these may be done away with with equal effect, I may not use them.

Metallic springs N N are attached to the sides of the molds, near their front ends, and bear against the sides of the casing nearly opposite the ends or corners $f^2 f^2$ of the molds, which will have a tendency to close in the meeting surfaces $h$, and thereby cause the front opening of the molds to remain always open, so that no resistance may be offered when the punch is entering the molds, which will obviate any chance of friction to the counter.

A plate, K, somewhat of the shape shown in Fig. 4, is fastened to the bottom of the casing C, the bottom of the molds being also provided with plates L L, so constructed that their outer faces will project a slight distance beyond the side edges of the molds C' C', and being beveled or rounded sufficiently to gradually form the upturn.

The operation of the molds will be as follows: After the counter-blanks have fallen before the face of the molds and the grippers $b'$ have gripped them, they will enter the molds with the plungers, their lower ends, O, however, projecting beneath the plates K and L L, as shown in Fig. 5, assuming the position shown in dotted lines in Fig. 4 after the plungers have partially entered the molds. When the plungers have reached the extreme inside of the molds, the corners $f^2 f^2$ will be forced out toward the sides of the casing, drawing the pivot-point $i$ beyond the edge of the plate K, which will thus fold in and form the back portion of the upturn, and when the corners $f^2 f^2$ have reached the sides of the casing and the pressure of the plungers upon the molds is continued, the front ends of the molds will be drawn together, which will have the effect of causing the plates L L, which are made fast to the molds, to be drawn in around the plungers, and thus form the side portions of the upturn.

It will of course be understood that the concave portions $k \, k$ of the plate K and the convex portions $l \, l$ of the plates L L will be so formed that the one will work within the other at the proper time, so as to avoid any chance of the counter being gripped between them.

In Fig. 7 I have shown a mold beveled outward at its back ends, or reverse to that above described, and having its rear ends, $f \, f$, bearing upon two pins or bolts, P P, set in the casing C, which pins may be made adjustable therein. The action of this mold will be somewhat similar to that above described. When the plunger enters and reaches the extreme inside of the molds, and the pressure continues, the back surfaces, $f \, f$, of the mold-sections will run along the pins P P till the corners $f^2 f^2$ bear upon the sides of the casing C, which will cause the mold to act upon the counter similarly to that above described.

The casing C is made, preferably, with adjustable sides, which enables me to increase or lessen the pressure upon the counter, as by drawing the sides together they will more firmly press upon the springs N N, which will have the effect of keeping the mouth of the molds more open, and when the plunger has entered the resistance is increased, thereby giving a somewhat greater pressure to the counter, and by drawing the sides farther apart the tension upon the springs N N is decreased, and as a result the pressure upon the counter is lessened.

To enable me to produce paste-leather counters with my molds, which, as is well known, is a difficult task, on account of the delicacy and unevenness of the fiber, I make the inside of my molds somewhat of the desired shape of the stiffener, but slightly larger, and place therein a thin metallic lining, Q, somewhat smaller than the required size of the counter. This lining is attached to the bottom of the mold-sections and at their meeting surfaces $h$ by screws or otherwise, and is arranged so as to bear against the back part of the molds at the point $i$, but slightly apart from the sides, so that when the plunger and blank have entered the molds and reached the point $i$, and the pressure is continued, the action of the front parts of the molds in closing around the counter and plunger will cause the lining to yield, thus allowing for any unevenness in the material. This lining Q is provided with several slits or cuts, $g$, at the top, and is allowed to remain loose at the top to permit of its being drawn down upon all parts of the counter, it being, of course, understood that these cuts are so made as to only reach near the upper part of the counter, which will obviate any chance of the counter being gripped between them and thereby destroyed.

Although I have shown the horizontal rack of sufficient width to attach but one plunger at each end, and the frame-work only wide enough to hold one mold, it must be understood that I reserve the right of strengthening and altering the parts, so that two or more plungers and a similar number of molds may be placed at each end of the machine.

The operation of my invention will almost be understood from the foregoing; but to more fully describe it I would add that the driving-shaft having been put in motion, the gear-wheel F' will revolve with it, which in turn sets the gear-wheel E in motion. The pulley or stud $e$, having been properly adjusted, will then bear alternately upon the arms $D^2$ and $D^3$ with the revolution of the gear E, and cause the sector-gear to rock upon its shaft or bearings, which will impart a reciprocating motion to the rack, and thereby cause the plungers B' B' to enter their respective molds C' C' alternately. After one of the plungers has entered the molds and the desired pressure to the counter given, the action of the roller or stud $e$ in its circuit will cause it to be withdrawn gradually, and when the plunger has been withdrawn so far as to allow the arm or pin $c$ of the gripper $b'$ to come in contact with the forked end of the arm $c'$, it will force it away from the face of the molds and allow the blank counter to fall in front of the mouth of the molds; and at the same time, when the shoulder $c^3$ has reached the projection on the standard G and the plunger is still receding, the arm $c'$ of the gripper will cause its rear end to be depressed, thereby releasing the hold upon the counter, the spring H serving to immediately release the counter from contact with the plunger. The plunger and molds at the opposite end of the machine in their turn act in a similar manner to those above described.

Having thus described my invention, what I claim, and desire to secure by Letters Patent, is as follows:

1. In a machine for forming heel counters or stiffeners for boots and shoes, a sector-gear having extended arms or horns connected thereto adjustable by mechanism, as described, and adapted to receive a rocking motion by means of a roller or stud working between the said arms or horns, said roller or stud made adjustable within a gear-wheel suitably mounted within the frame-work, in combination with the horizontal toothed rack having the plungers or punches attached thereto, and the molds placed at each end of the machine, the whole arranged and operating substantially in the manner and for the purposes described.

2. In a counter-forming machine, the sector-gear D, having extended arms or horns $D^2 D^3$, bolt and nut $d'$, in combination with the pulley $e$, made adjustable in the gear-wheel E, the gear-wheel E, rack B, and plungers B' B', substantially in the manner and for the purposes described.

3. In combination with the plungers B' B', provided with grippers $b'$ $b'$, springs $b^4 b^4$, and arms $c$, as described, the forked arms $c'$, spiral springs $g$, standards G, and springs H H, substantially as and for the purposes set forth.

4. The herein-described molds made up of two halves, having their rear ends beveled inward toward the center $f'$, and their sides forming obtuse angles thereto, and having screwed or otherwise fastened thereto plates L L, in combination with the casing C, provided with plate K, substantially in the manner and for the purposes described.

5. The herein-described molds made up of two halves and having their rear ends beveled and their sides forming obtuse angles thereto, and provided with a yielding metallic lining, Q, and plates L L, in combination with the casing C, provided with plate K, substantially in the manner and for the purposes described.

M. HYNES.

Witnesses:
J. A. RENNIE,
E. C. VAREY.